(12) United States Patent
Hsu

(10) Patent No.: US 6,786,135 B1
(45) Date of Patent: Sep. 7, 2004

(54) STEAM STRUCTURE FOR AN ELECTRIC COFFEE MAKER

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/778,250

(22) Filed: Feb. 17, 2004

(51) Int. Cl.⁷ .......................... A47J 31/40; A47J 31/44; A47J 31/46; A23C 9/00; A23L 1/00

(52) U.S. Cl. .............................. 99/293; 99/299; 99/300; 99/323.1; 99/453

(58) Field of Search .................. 99/452–455, 275–279, 99/291, 289 R, 293–295, 281–286, 300, 302 R, 323.1–323.3, 299, 516; 261/78.1, 121.1, DIG. 16, DIG. 76; 141/70, 82; 366/101, 176.1, 167.1, 163.1; 426/477

(56) References Cited

U.S. PATENT DOCUMENTS

| | | | | |
|---|---|---|---|---|
| 4,565,121 A | * | 1/1986 | Ohya et al. .................... | 99/281 |
| 4,583,449 A | * | 4/1986 | Dangel et al. ................. | 99/279 |
| 4,960,042 A | * | 10/1990 | Grossi .......................... | 99/293 |
| 4,995,311 A | * | 2/1991 | Naya et al. .................... | 99/295 |
| 5,768,981 A | * | 6/1998 | Cicchetti ....................... | 99/453 |
| 5,778,765 A | * | 7/1998 | Klawuhn et al. .............. | 99/290 |
| 5,862,740 A | * | 1/1999 | Grossi .......................... | 99/293 |
| 6,085,638 A | * | 7/2000 | Mork et al. .................... | 99/282 |
| 6,279,459 B1 | * | 8/2001 | Mork et al. .................... | 99/281 |
| 6,374,725 B1 | * | 4/2002 | Leung .......................... | 99/293 |
| 6,405,637 B1 | * | 6/2002 | Cai ............................... | 99/293 |
| 6,532,862 B2 | * | 3/2003 | Mork et al. ............... | 99/302 C |
| 6,681,685 B2 | * | 1/2004 | Mahlich ....................... | 99/453 |

* cited by examiner

*Primary Examiner*—Timothy F. Simone
(74) *Attorney, Agent, or Firm*—Rosenberg, Klein & Lee

(57) ABSTRACT

A steam structure for an electric coffee maker includes a throttle valve, a steam pipe, an enclosing valve, a valve seat and a backflow pipe, wherein the steam pipe is connected to one side of the throttle valve. The throttle valve is connected to the valve seat at the bottom thereof, and the valve seat then is connected to the backflow pipe. The enclosing valve is placed in the valve seat. The enclosing valve is made of flexible material and includes a valve, a thin film surrounding the valve, and a skirt with holes thereon. The outer edge of the skirt is in touch with the valve seat. The outer diameter of the valve corresponds to the inner diameter of the backflow pipe. When the skirt is pressed downward by the valve due to the steam pressure, the valve encloses the backflow pipe.

1 Claim, 3 Drawing Sheets

STEAM STRUCTURE FOR AN ELECTRIC COFFEE MAKER

FIELD OF THE INVENTION

This invention relates to a steam structure for an electric coffee maker, and more particularly to a coffee maker which permits steam to flow through a steam pipe and water flows back to a water tank through a backflow pipe.

BACKGROUND OF THE INVENTION

A conventional coffee maker has a throttle valve to control the steam from a steam pipe.

The conventional coffee maker encounters a problem that the pressure is not strong enough, thus, water drops come out with the steam. This downgrades the taste of coffee.

A new design was developed to increase the pressure of the steam. When the steam evaporates through a pipe, some is kept in the pipe and becomes water, which also downgrades the taste of coffee.

In view of this, the present invention provides a throttle valve, which keeps water and permits only steam to go through a pipe.

SUMMARY OF THE INVENTION

It is the primary object of the present invention to provide a steam structure for an electric coffee maker, which retains all water back into a water tank and allows only steam to evaporate.

It is another object of the present invention to provide a steam structure for an electric coffee maker, which provides a best quality of brewing coffee in the market.

It is a further object of the present invention to provide a steam structure for an electric coffee maker, which is a sophisticated design.

DETAILED DESCRIPTION OF THE PREFERRED EMBODIMENT

Figure 1:
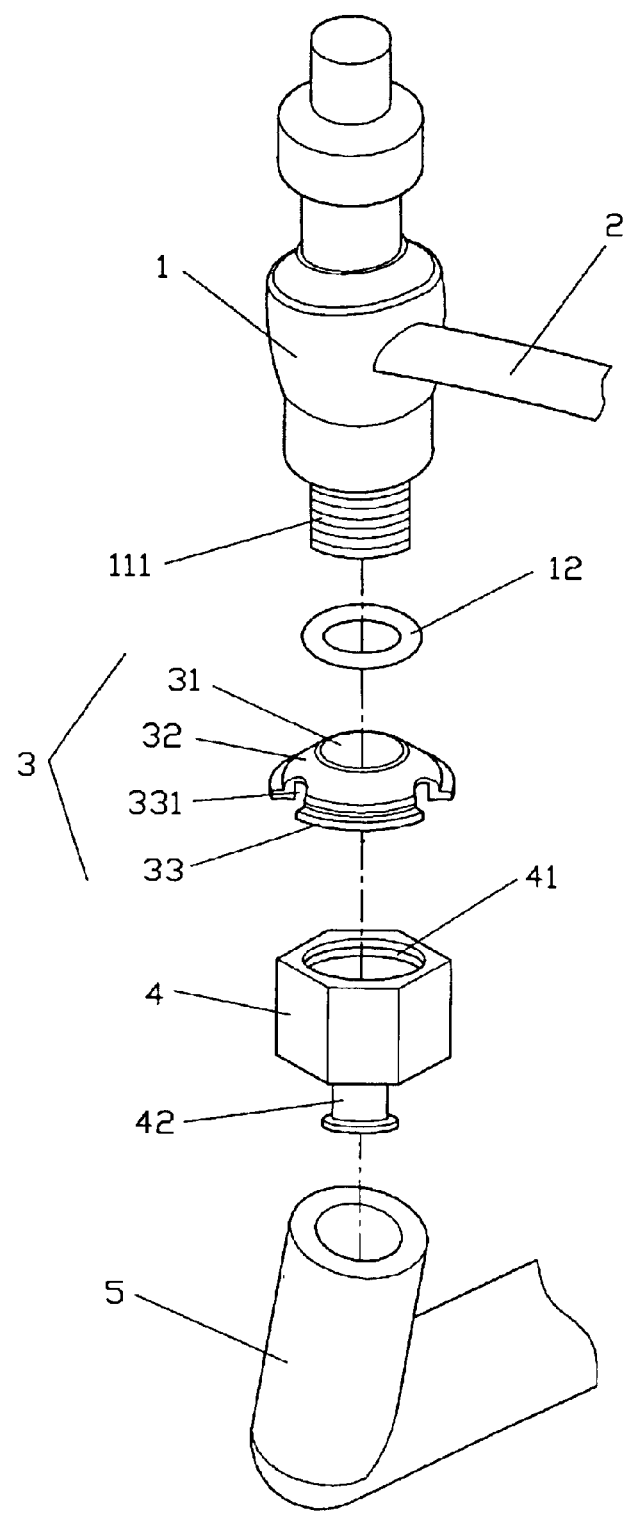
FIG. 1 is an exploded view of the present invention.
Figure 2:
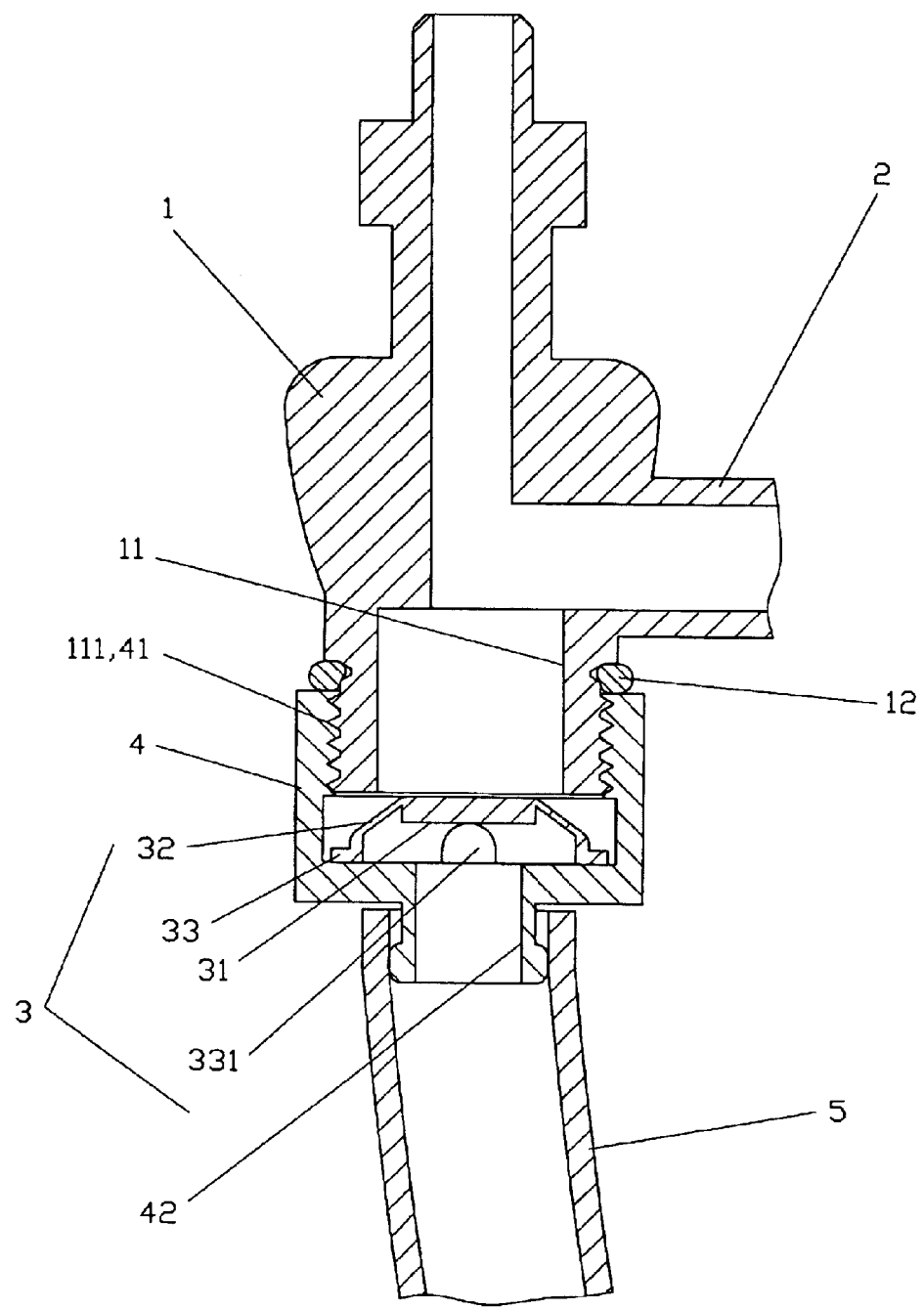
FIG. 2 is a cross-sectional view of the present invention.

As shown in FIGS. 1 and 2, the present invention comprises a throttle valve 1, a steam pipe 2, an enclosing valve 3, a valve seat 4 and a backflow pipe 5, wherein the steam pipe 2 is connected to one side of the throttle valve 1.

The throttle valve 1 has a connecting pipe 11 inwardly. The connecting pipe 11 has threads 111 being threaded with a washer 12 to threads 41 of the valve seat 4. The bottom end of the valve seat 4 is connected to the backflow pipe 5 through a connecting pipe 42. The valve seat 4 has a hollow body to connect with the connecting pipe 11 and the backflow pipe 5. The enclosing valve 3 is placed within the valve seat 4. The enclosing valve 3 is made of flexible material and includes a valve 31, a thin film 32, and a skirt 33. The skirt 33 surrounds the thin film 32 which then surrounds the valve 31. The skirt 33 comprises a plurality of holes 331. The outer edge of the skirt 33 engages with the valve seat 4. The outer diameter of the valve 31 corresponds to the inner diameter of the backflow pipe 5.

Figure 3:
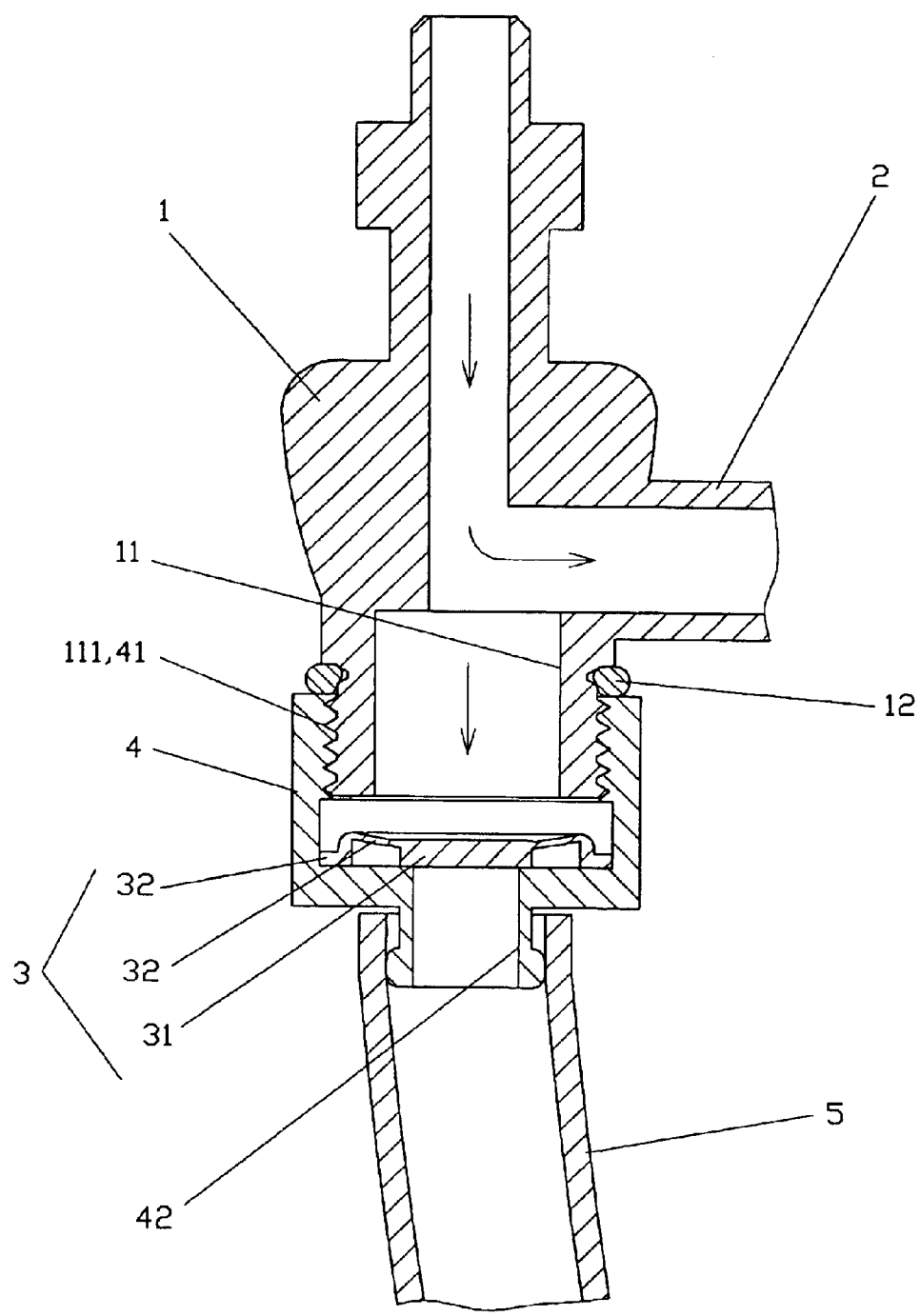
FIG. 3 is a cross-sectional view showing the operation of the present invention.

The valve 31 is pushed by the thin film 32 to stay away from the backflow pipe 5 in an idle status, as shown in FIG. 2. The holes 331 of the skirt 33 are interconnected to the backflow pipe 5. When the enclosing valve 3 is pushed by the pressure of steam to squeeze the thin film 32 with its valve 31, as shown in FIG. 3, the valve 31 seals the backflow pipe 5, which forces water drops flow back to a water reservoir when the steam pressure is weak. When the steam pressure is strong, the steam flows out through the steam pipe 2.

I claim:

1. A steam structure for an electric coffee maker comprising a throttle valve, a steam pipe, an enclosing valve, a valve seat, and a backflow pipe, wherein said steam pipe being connected to one side of said throttle valve, and characterized by:

said throttle valve comprising a connecting pipe with a bottom of said connecting pipe being connected to said valve seat, said valve seat being connected to said backflow pipe, said valve seat having a hallow body interconnected with said connecting pipe of said throttle valve and said backflow pipe, said enclosing valve being placed in said valve seat, said enclosing valve being made of flexible material and comprising a valve, a thin film surrounding said valve, and a skirt with holes thereon, an outer edge of said skirt engaging with said valve seat, said valve having an outer diameter corresponding to an inner diameter of said backflow pipe, thus, said valve being pushed by said thin film to stay away from said backflow pipe in an idle status, and said holes of said skirt being interconnected with said backflow pipe, upon receiving steam pressure, said valve pushing down said thin film, thus said valve sealing said backflow pipe.

* * * * *